(12) United States Patent
Simmons, II et al.

(10) Patent No.: US 11,731,081 B2
(45) Date of Patent: Aug. 22, 2023

(54) FLUID POWER CIRCUIT HAVING SWITCH-MODE POWER TRANSFORMER AND METHODS

(71) Applicant: Regents of the University of Minnesota, Minneapolis, MN (US)

(72) Inventors: Jeremy W. Simmons, II, Roseville, MN (US); James D. Van de Ven, Long Lake, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 531 days.

(21) Appl. No.: 16/916,439

(22) Filed: Jun. 30, 2020

(65) Prior Publication Data
US 2021/0031143 A1 Feb. 4, 2021

Related U.S. Application Data

(60) Provisional application No. 62/880,465, filed on Jul. 30, 2019.

(51) Int. Cl.
*B01D 61/02* (2006.01)
*B01D 61/14* (2006.01)
(Continued)

(52) U.S. Cl.
CPC ........... *B01D 61/025* (2013.01); *B01D 61/06* (2013.01); *B01D 61/10* (2013.01); *B01D 61/147* (2013.01);
(Continued)

(58) Field of Classification Search
CPC ....... B01D 61/025; F03B 13/14; Y02E 10/30; Y02A 20/144
See application file for complete search history.

(56) References Cited

U.S. PATENT DOCUMENTS 4,512,886 A * 4/1985 Hicks .................... F03B 13/189
210/416.1
5,186,822 A * 2/1993 Tzong .................... F03B 13/18
210/257.2
(Continued)

FOREIGN PATENT DOCUMENTS

CA 2731264 12/2009
CN 204039143 U * 12/2014
(Continued)

OTHER PUBLICATIONS

Pan et al., "Active control of pressure pulsation in a switched inertance hydraulic system", Journal of Systems and Control Engineering, pp. 610-620 (Year: 2013).*
(Continued)

*Primary Examiner* — Thomas E Lazo
(74) *Attorney, Agent, or Firm* — Dicke, Billig & Czaja, PLLC

(57) ABSTRACT

A fluid power circuit with a switch-mode power transformer used to transfer power while keeping the pressure of power source and reverse osmosis processes relatively decoupled. The switch-mode power transformer uses the inertia of a hydraulic motor driven electric generator and switching of a hydraulic motor inlet between high and low-pressure ends to decrease the pressure at which power is being transmitted to a reverse osmosis process.

20 Claims, 8 Drawing Sheets

(51) Int. Cl.
  *B01D 61/06* (2006.01)
  *B01D 61/10* (2006.01)
  *F03B 13/12* (2006.01)
  *F03B 13/14* (2006.01)
  *F03B 13/22* (2006.01)

(52) U.S. Cl.
  CPC .............. *F03B 13/12* (2013.01); *F03B 13/14* (2013.01); *F03B 13/22* (2013.01); *B01D 2313/246* (2013.01); *B01D 2313/36* (2013.01); *B01D 2313/367* (2022.08)

(56) References Cited

U.S. PATENT DOCUMENTS

| | | | | |
|---|---|---|---|---|
| 7,305,823 | B2 * | 12/2007 | Stewart | H02K 7/1876 60/495 |
| 8,587,143 | B2 * | 11/2013 | Skinner | F03B 15/02 60/413 |
| 9,222,527 | B2 | 12/2015 | Stromotich | |
| 9,975,089 | B2 * | 5/2018 | Oklejas, Jr. | C02F 1/441 |
| 2011/0006005 | A1 * | 1/2011 | Thomson | B01D 61/025 210/170.11 |
| 2018/0104648 | A1 * | 4/2018 | Oklejas, Jr. | B01D 61/08 |
| 2019/0151798 | A1 * | 5/2019 | Lafortune | C02F 1/441 |

FOREIGN PATENT DOCUMENTS

| | | | | |
|---|---|---|---|---|
| JP | 2016022460 | A * | 2/2016 | |
| WO | WO-2010025532 | A2 * | 3/2010 | ............ C02F 1/441 |
| WO | WO-2014100674 | A1 * | 6/2014 | ............ F03B 13/14 |

OTHER PUBLICATIONS

Simmons, III, Jeremy W. and Van de Ven, James D., "Switch-Mode Power Transformer in a Wave-Powered, Reverse Osmosis Desalination Plant," Proceedings of the ASME/BATH, Symposium on Fluid Power and Motion Control, pp. 1-12 (Oct. 2019).

Gude, Veera, "Desalination and sustainability—An appraisal and current perspective," Water Research, 89, pp. 87-106 (2016).

Leijon, J. et al., "Freshwater production from the motion of ocean waves," Desalination, 435, pp. 161-171 (2018).

Cao, J. et al., "Switchmode Hydraulic Power Supply Theory*," ASME International Mechanical Engineering Congress and Exposition, Proceedings of IMECE2005. pp. 1-7 (2005).

Van de Ven, James D., "Soft Switch Lock-Release Mechanism for a Switch-Mode Hydraulic Pump Circuit," Journal of Dynamic Systems, Measurement, and Control, vol. 136, pp. 031003-1-031003-12 (May 2014).

Dießel, Dominic, Bryans, G., Verdegem, L., and Murrenhoff, H., "Wavepod a transmission for wave energy converters—set-up and testing," Int. J. of Fluid Power, vol. 16, No. 2, pp. 75-82 (2015).

Cho, B., Lee, H., and Oh, J., "Estimation Technique of Air Content in Automatic Transmission Fluid by Measuring Effective Bulk Modulus," Int. J. of Automot. Technol., vol. 3, No. 2, pp. 57-61 (2002).

Trikha, A. K., "An Efficient Method for Simulating Frequency-Dependent Friction in Transient Liquid Flow," J. Fluids Eng., pp. 97-105 (Mar. 1975).

Schohl, G. A., "Improved Approximate Method for Simulating Frequency-Dependent Friction in Transient Laminar Flow," J. Fluids Eng., Transactions of the ASME, vol. 115, No. 3, p. 420-424, (1993).

Yudell, A. C., and Van de Ven, James D., "Experimental Validation of a Time Domain Cavitation Model for Switched Inertance Circuits," in Proceedings of the ASME/BATH Symposium on Fluid Power and Motion Control, pp. 1-12 (2017).

* cited by examiner

FIG. 6A
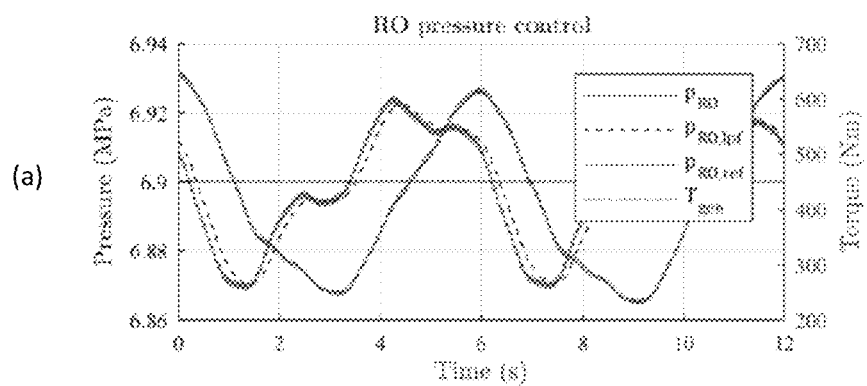
(a)
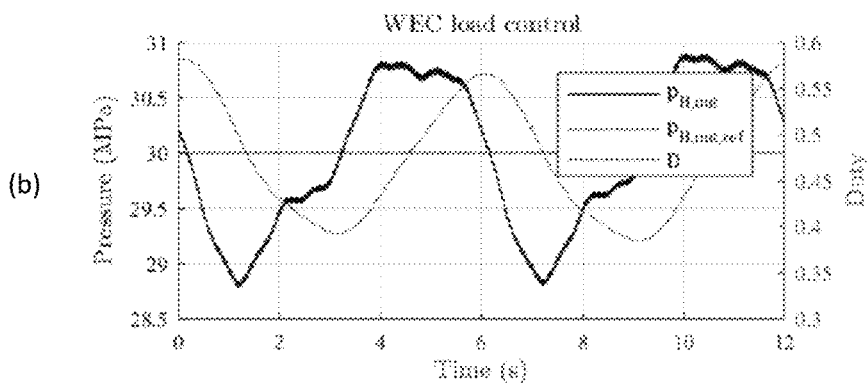
(b)
FIG. 6B

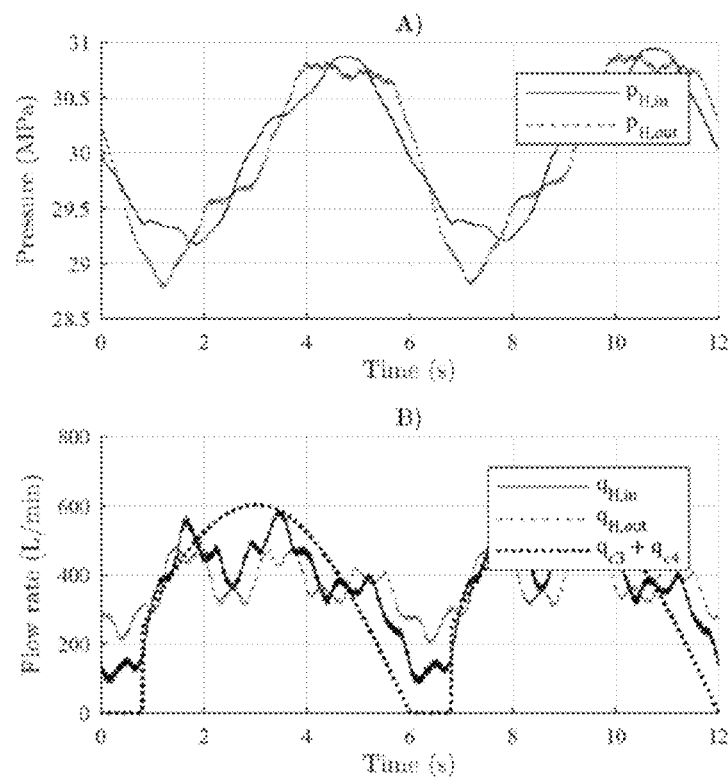

FIG. 9A
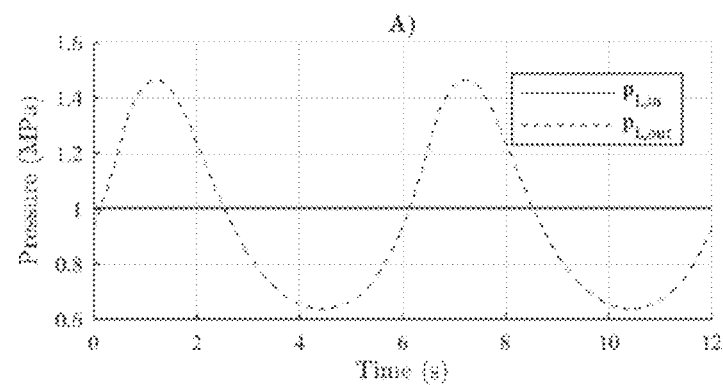
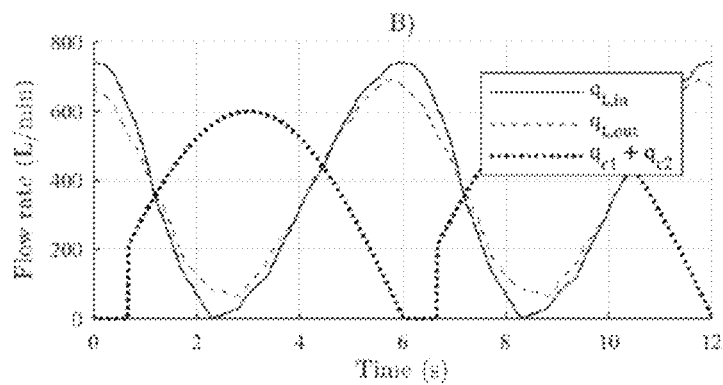
FIG. 9B

FLUID POWER CIRCUIT HAVING SWITCH-MODE POWER TRANSFORMER AND METHODS

RELATED APPLICATIONS

This Non-Provisional patent application claims the benefit of the filing date of U.S. Provisional Patent Application Ser. No. 62/880,465, filed Jul. 30, 2019, entitled "FLUID POWER CIRCUIT HAVING SWITCH-MODE POWER TRANSFORMER AND METHODS," the entire teachings of which are incorporated herein by reference.

GOVERNMENT SUPPORT CLAUSE

This invention was made with Government support under contract number DE-SC0017699 awarded by DOE, Office of ARPA-E. The Government has certain rights in this invention.

BACKGROUND

For many coastal locations, ocean wave energy is a substantial resource but is challenging to covert directly to electricity. However, hydraulic power-take-offs (PTOs) are well suited for the low speeds and high forces that are characteristic of wave energy converter (WEC) operation as well as the high-speed, low torque that is more suitable for electrical power generation, allowing easier coupling of the energy harvesting and electrical power generation. There have been a few WECs demonstrated having hydraulic PTOs and several computer-aided design studies exploring their use. There has also been a recent effort in the design and testing of a universal WEC PTO using a fluid power circuit.

Beyond generating electricity, several groups have considered harvesting the energy of ocean waves as an alternative to using diesel generators and photovoltaic devices to power seawater desalination plants, specifically reverse osmosis desalination. A number of groups have explored the direct coupling of the PTO and reverse osmosis fluid power circuits.

In the reverse osmosis desalination process, filtered seawater is pressurized to overcome the osmotic pressure across a semi-permeable membrane. A fraction of the water permeates across the membrane while high salt concentration brine is discharged through a separate port.

The present disclosure addresses problems and limitations associated with the related art.

SUMMARY

Various examples of the disclosure include fluid circuits, systems, or plants to decouple the pressures of wave energy harvesting and reverse osmosis process, while being more energy efficient and having less costly components. Generally, various disclosed embodiments include an efficient hydraulic switch-mode power transformer that takes input from a wave energy converter-driven actuator and efficiently transforms the input to pressures needed for reverse osmosis desalination, and uses a generator shaft to store and release kinetic energy and achieve a dual purpose: that being flow control and electricity production.

One example of the disclosure includes a fluid power circuit comprising a hydraulic power source, which can be comprised of a wave energy converter-driven actuator, having a high-pressure end and a low-pressure end. The circuit further includes a switch-mode power transformer having a pumping mode and a motoring mode. The switch-mode power transformer has a valving (e.g., a switching valve and a check valve, or the like) that connects to the high-pressure end and the low-pressure end, respectively, of the hydraulic power source, and a hydraulic inertial element having an outlet to a load and an electric generator having a rotor. The fluid power circuit further includes a reverse osmosis system. When the valve(s) (e.g., switching valve) fluidly connect the hydraulic inertial element to the first high-pressure end, the hydraulic inertial element operates as a motor and when the valve(s) (e.g. switching valve) fluidly connect the hydraulic inertial element to the low-pressure end, the hydraulic inertial element operates as a pump. In this circuit, the generator is configured to convert excess mechanical power to electrical power, maintaining a mean fluid flow rate supplied to the reverse osmosis system.

Another example of the disclosure includes a wave-powered reverse osmosis desalination plant including a wave energy converter including a hydraulic power source, which can be part of a wave energy converter-driven actuator, having a high-pressure end and a low-pressure end. The plant further including a switch-mode power transformer having a pumping mode and a motoring mode. The switch-mode power transformer has valving (e.g., switching valve and a check valve) that is connected to the high-pressure end and the low-pressure end of the hydraulic power-source, and a hydraulic inertial element having an outlet to a load and an electric generator having a rotor. The plant further includes a reverse osmosis system. When the valving (e.g., switching valve) is open, the hydraulic inertial element is fluidly connected to the high-pressure end and the hydraulic inertial element operates as a motor and when the valving (e.g., switching valve) is closed, the hydraulic inertial element is fluidly connected to the low-pressure end and the hydraulic inertial element operates as a pump. In this example, the generator is configured to convert excess mechanical power to electrical power, maintaining a mean fluid flow rate supplied to the reverse osmosis system.

Various methods of the disclosure include a method of producing power including providing a wave-powered reverse osmosis desalination plant including a wave energy converter-device actuator including a hydraulic power source having a high-pressure end and a low-pressure end. The method further providing a switch-mode power transformer having a pumping mode and a motoring mode. The switch-mode power transformer has a valving (e.g., switching valve and a check valve), each of which are connected to the high-pressure end and the low-pressure end of the hydraulic power source, and a hydraulic inertial element having an outlet to a load and an electric generator having a rotor. A reverse osmosis system is also provided. The method may include opening the valving (e.g., switching valve) so that the hydraulic inertial element is fluidly connected to the high-pressure end and the hydraulic inertial element operates as a motor. The method may include closing the valving (e.g., switching valve) so that the hydraulic inertial element is fluidly connected to the low-pressure end and the hydraulic inertial element operates as a pump.

Various embodiments of the disclosure allow for reduced component sizes upstream of the device in a fluid power circuit, use fewer costly components and also add less significant power loss mechanism than conventional hydraulic transformers. In addition, particular to reverse osmosis desalination plants driven by wave power, the pressure at which the power source from the wave energy converter-device actuator is loaded and the pressure at which the reverse osmosis process occur are decoupled. Such a configuration of devices couples the two processes without coupling the pressure. Further, the electric generator can operate as an electric motor to augment the performance of the transformer; which can out-perform conventional devices.

BRIEF DESCRIPTION OF THE DRAWINGS

FIGS. 6A-6B are graphs illustrating plant control behavior in cyclic steady-state.

FIGS. 8A-8B are graphs illustrating high-pressure pipeline dynamics.

FIGS. 9A-9B are graphs illustrating low-pressure pipeline dynamics.

DETAILED DESCRIPTION

Significant challenges arise in designing a coupled system to be reliable. In addition to the challenges of all wave energy systems, added challenges include: 1) the fluid power components must work with seawater as the working fluid; 2) the feed pressure of the reverse osmosis system is limited to about 700-1200 psi; and 3) the feed water pressures dynamics must be smooth and slow varying so that the relatively fragile reverse osmosis system components (e.g. reverse osmosis membrane elements) are not damaged.

Figure 1:
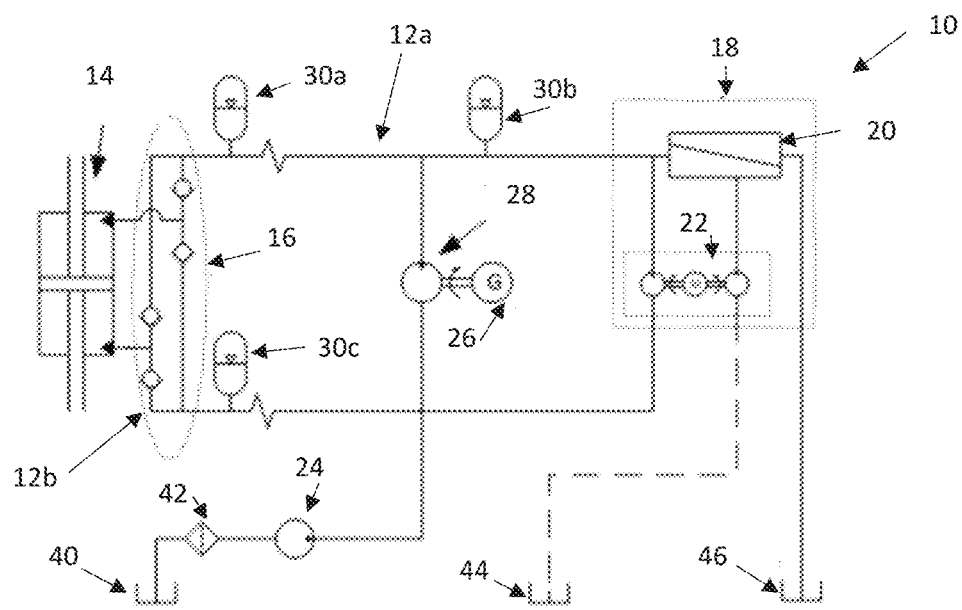
FIG. 1 is a schematic diagram of a simple wave-powered reverse osmosis desalination plant with electrical power generation.

The schematic of FIG. 1 illustrates a baseline hydraulic wave energy converter (WEC) hydraulic power source system or plant 10 (e.g., hydraulic power-take-offs "PTO" or the like) (having a high-pressure end 12*a* and a low-pressure end 12*b*) that generates both electricity and potable water. The system 10 includes: 1) a WEC-driven actuator 14 having a mechanical wave energy converter as a source of power (part of 14, which is shown schematically) and check valve rectifier 16 that together function as a pump; 2) a reverse osmosis (RO) system 18 comprised of the reverse osmosis membrane module 20 and an optional energy recovery unit (ERU) 22 to recover power from the high-pressure brine that would otherwise be throttled; 3) a charge pump 24 that resupplies seawater consumed in the reverse osmosis process; and 4) an electric generator 26 driven by a hydraulic motor 28 that supplies the electrical power demands of the plant or system 10. For serviceability, the reverse osmosis system 18 and genset 26, 28 are installed onshore while the WEC-driven actuator 14 is offshore. The seawater is pumped through the long pipelines connecting these parts of the plant 10, which are typically separated by a distance on the order of 500 meters, for example. High-pressure accumulators (HPAs) 30*a*, 30*b* and a low-pressure accumulator (LPA) 30*c* are implemented for smoothing the highly variable power associated with the oscillatory WEC motion. As shown, the system 10 can include a feed water intake 40, filter 42 upstream from the charge pump 24. In addition, the system 10 can include a brine outlet 44 downstream from the ERU 22 and permeate outlet 46 downstream from the RO system 18. Without the reverse osmosis system 18, this system 10 is similar to the general approach taken as disclosed by D. Dießel, G. Bryans, L. Verdegem, and H. Murrenhoff, "Wavepod a transmission for wave energy converters—set-up and testing," *Int. J. Fluid Power*, vol. 16, no. 2, pp. 75-82, 2015.

This baseline design for system 10 has three inherent drawbacks stemming from the pressures of the WEC-driven actuator 14 and the reverse osmosis system 18 being closely coupled. First, is that the range of pressures required for a reverse osmosis system 18 (about 700-1200 psi) are lower than typical hydraulic systems. The low operating pressures require higher flow rates and larger components than would be if the PTO were operated at higher pressures. Second, load control on the WEC-driven actuator 14 is limited by the reverse osmosis system 18 operation. Thirdly, the plant 10 must be designed to keep the magnitude of pressure variations in the onshore HPA 30*a*, 30*b* low to avoid damage to the reverse osmosis system 18; this would require very large accumulators.

Figure 2:
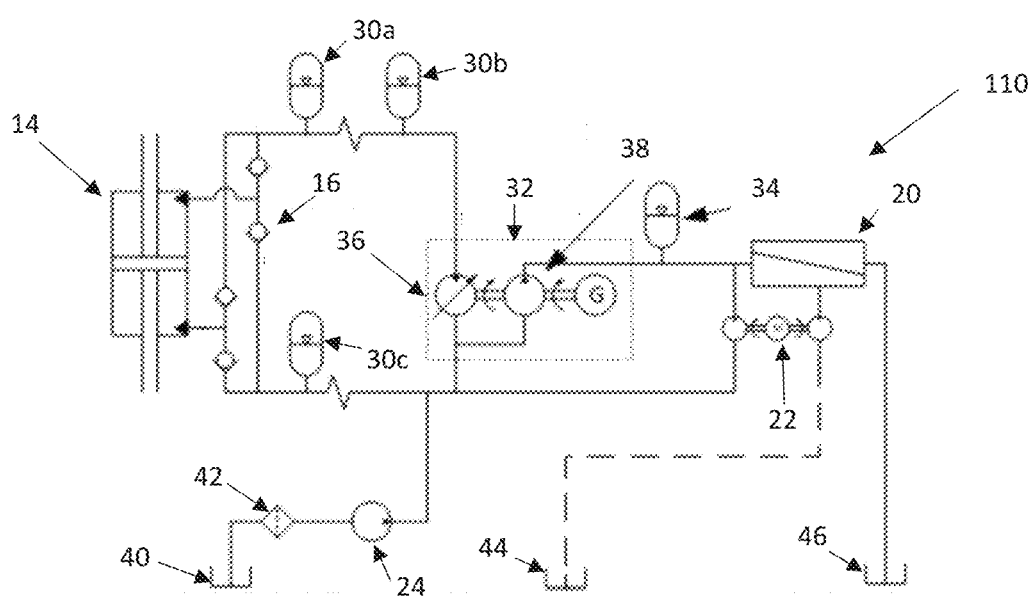
FIG. 2 is a schematic diagram of a wave-powered reverse osmosis desalination plant with a conventional power transformer.

As an alternative, as shown in FIG. 2, the pressures at which the PTO and reverse osmosis system 18 each operate can be decoupled with a hydraulic transformer 32. A fluid circuit 110 shown in FIG. 2 implements a variable displacement motor 36 and fixed hydraulic displacement pump 38 to form a conventional hydraulic transformer 32. This approach allows downsizing the WEC-driven actuator 14 and pipelines to shore, as they can operate at a higher pressure, and allows more flexible control of the load on the WEC-driven actuator 14. However, this adds costly components and significant sources of power loss.

Figure 3:
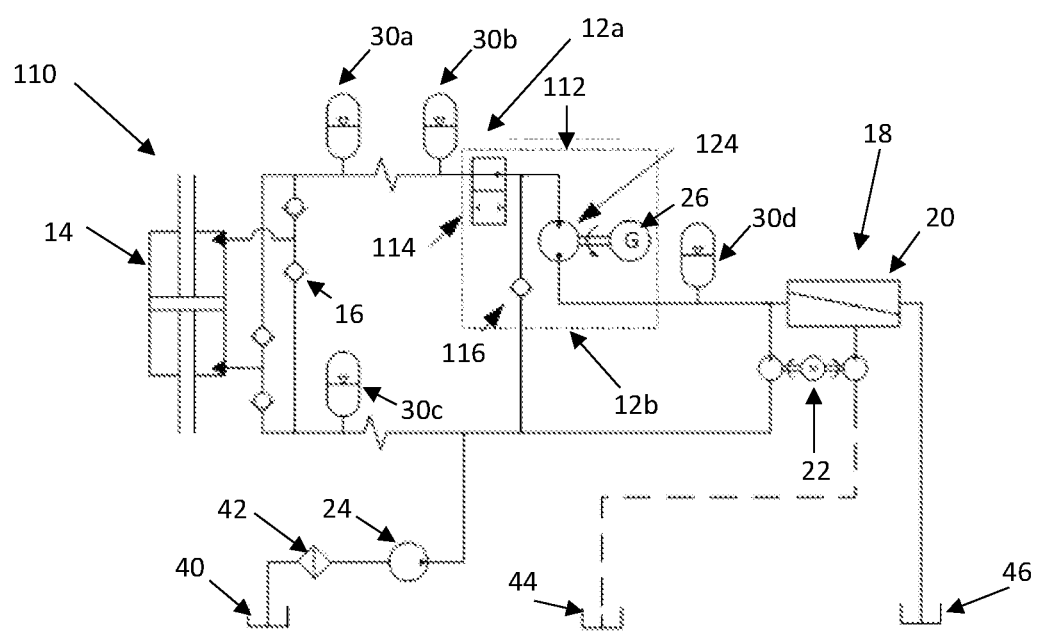
FIG. 3 is a schematic diagram of a wave-powered reverse osmosis desalination plant having a fluid power circuit with a switch-mode power transformer.

As schematically depicted in FIG. 3, in various embodiments of the disclosure, a system/plant or fluid power circuit 110 can include a switch-mode power transformer 112 utilized in place of the conventional transformer 32 of FIG. 2. The transformer 112 can utilize many of the same components as the system in FIG. 1 and adds valving (e.g., two valves 114, 116: a two-way switching valve 114 and a check valve 116). In alternate embodiments, the system 110 can include valving being a three-way valve that combines the function of valves 114 and 116. This circuit 110 allows the same pressure transformation as the conventional hydraulic transformer 32 through pulse-width-modulated (PWM) control, or some other type of switching control, of the two-way valve 114. It is noted that components illustrated, but not specifically identified in FIG. 3, can be akin to the identifications found in FIGS. 1 and 2, for example.

The Switch-Mode Power Transformer

The switch-mode power transformer 112 operates through the fast switching of the two-way valve 114 between discrete states. In these discrete states, a hydraulic inertial element or pump/motor 124 operates in either a pumping mode or a motoring mode. When the two-way valve 114 is open, the inlet to the pump/motor 124 is connected to the high-pressure accumulator 30*b* upstream and operates as a motor. In this mode, the pump/motor 124 accelerates the generator 26 rotor, storing kinetic energy. When the two-way valve 114 is closed, the inlet to the pump/motor 124 is connected (via the check valve 116) to the low-pressure outlet of the optional charge pump 126 and operates as a pump. In the pump mode, the pump/motor 124 uses energy stored in a rotor of the generator 26 to drive the working fluid. The mean flow rate supplied to the reverse osmosis system 18 is maintained by converting excess mechanical power to electricity.

The power transformation is modulated by the length of time spent in either discrete state during each pulse cycle. This is described by the duty ratio, D, given by $$D = \frac{t_h}{T_{sw}} \quad (1)$$

where $T_{sw}$ is the switching period and $t_h$ is the length of time the switching valve 114 is open. The switching period is the inverse of the switching frequency, $f_{sw}$.

The present disclosure demonstrates this unique switch-mode system 110 as a solution for coupling the wave-energy harvesting process with the reverse osmosis process by illustrating the behavior of the plant and quantifying the performance of one design. A mathematical model, presented below, is solved numerically to demonstrate and quantify the performance. Prescribed, sinusoidal displacements are used to simulate the WEC-driven actuator 14 motion driven by regular waves. The following section presents the mathematical models used to model this plant design. The next describes details of the design; specifically, the control laws used to regulate the plant are described and the parameters used in the simulation of the model are given. The section that follows presents simulation results along with the mean power losses, subsystem efficiencies, and a discussion.

In alternate embodiments, pump/motor 124 can be substituted with or supplemented with another hydraulic inertial element such as a long, small-diameter line or a switched-inertance hydraulic system, for example. In various embodiments, the hydraulic inertial element is fluid in a pipe or hose. In one example, the hydraulic inertial element is a long and/or small-diameter pipe, that is, with a length from several meters up to the order of the wavelength of a soundwave traveling in the pipe and/or diameter resulting in average fluid velocities greater than 3 m/s.

Modeling Examples

The model applied herein includes the entire fluid power circuit or system 110 shown in FIG. 3 except the reverse osmosis system 18. The input to the system model is the motion of the WEC-driven actuator 14. The outputs are the surplus electrical power generated and the seawater supplied to the reverse osmosis system 18.

Figure 4:
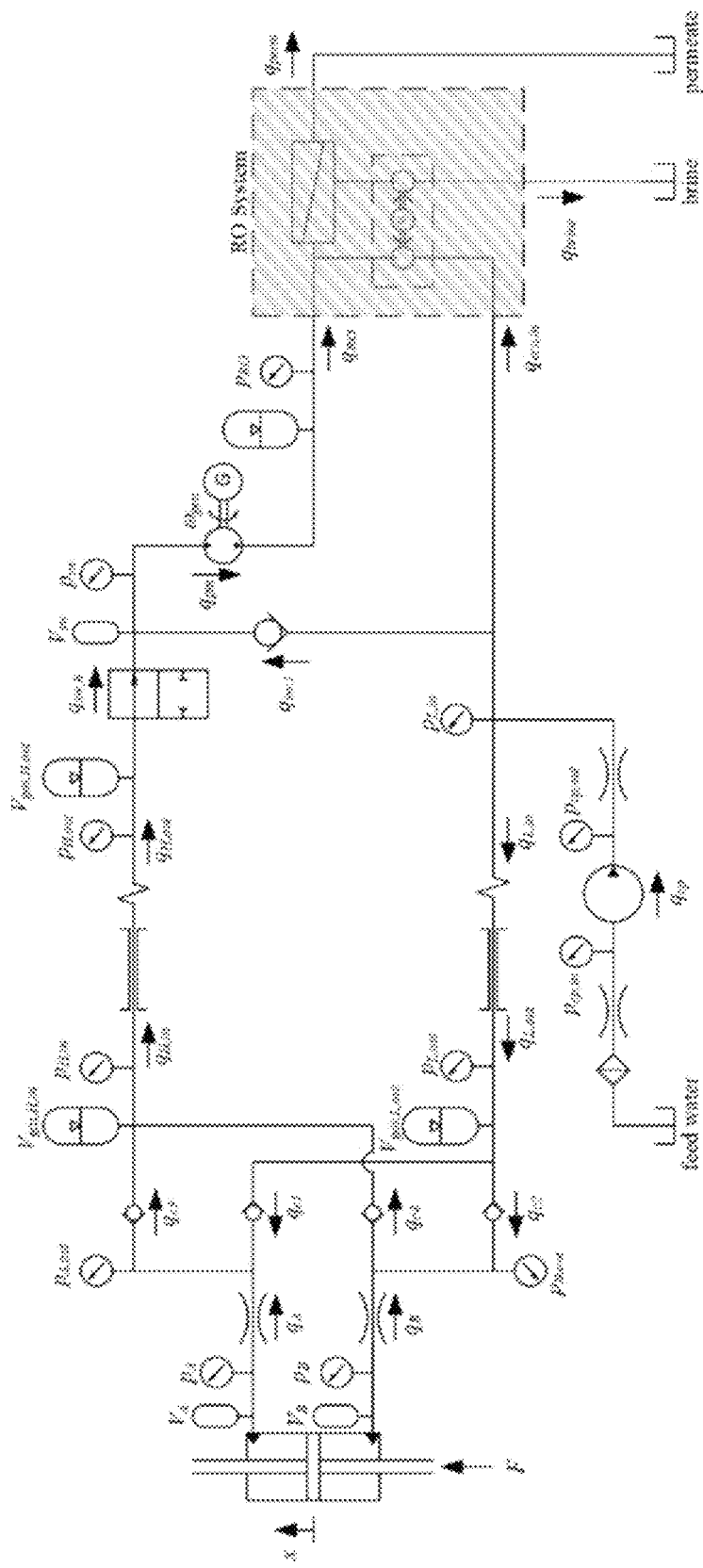
FIG. 4 is a modeling schematic diagram of a wave-powered reverse osmosis plant.

The system 110 has been re-represented for modeling in FIG. 4. It is noted that components illustrated, but not specifically identified in FIG. 4, can be akin to the identifications found in FIGS. 1-3, for example. Pressure nodes are labeled with the variable name used in modeling (p is used generically). The compressible volumes of fluid are indicated by a fluid volume and their variable name (V is used generically). The flow rates modeled and their variable names (q is used generically) are indicated by arrows pointing across their path and in the direction of positive flow. The position of the WEC-driven actuator, x (or 14 in FIG. 3), has the zero-position centered about the limits of travel.

The reverse osmosis system 18 is represented as two flow sinks, with the high-pressure feed flow rate, $q_{RO}$, equal to the permeate flow rate, $q_{perm}$, and the low-pressure flow rate, $q_{ERU,in}$, equal to the discharged brine flow rate, $q_{brine}$. This assumes the ERU 22, as shown in FIG. 1, is comprised of a pump and motor having equal displacement.

The position of the WEC-driven actuator 14 or x is prescribed in this study. Specifically, the position of the WEC-driven actuator 14 is assumed to be sinusoidal such that $$x = |x|\sin\left(2\pi \frac{t}{T_w}\right) \quad (2)$$

where $T_w$ is the wave period. In the case of a near constant reaction force of the PTO, the mean power captured by the WEC-driven actuator 14 can be characterized by its mean absolute velocity, $|\dot{x}|_{ave}$. Thus, the magnitude $|x|$ can be determined such that $$|x| = |\dot{x}|_{ave} \frac{T_w}{4}. \quad (3)$$

The mathematical models of the components and the components' power losses follow.

WEC-Driven Actuator

Two fluid volumes are created by the two chambers of WEC-driven actuator 14 or x and the intermediate piping between the WEC-driven actuator 14 and the check valve 116 rectifier. The pressure dynamics in these volumes are modeled using the definition of the bulk modulus such that $$\frac{dp}{dt} = \frac{\beta_{eff}}{V}\left(\frac{dV}{dt} - q_{out}\right) \quad (4)$$

where $\beta_{eff}$ is the effective bulk modules of the fluid, V is the instantaneous volume and $q_{out}$ is the net flow rate out of the volume.

The effective bulk modulus of the fluid is typically pressure dependent due to the entrainment of air. The model proposed in B. Cho, H. Lee, and J. Oh, "Estimation Technique of Air Content in Automatic Transmission Fluid by Measuring Effective Bulk Modulus," *Int. J. Automot. Technol.*, vol. 3, no. 2, pp. 57-61, 2002 is used, which considers the bulk modulus of a pure fluid and the compliance of an isentropically compressed volume fraction of air:

$$\beta_{eff}(p) = \beta \left( \frac{\left(\frac{p}{p_o}\right)^{\frac{1}{\gamma}} e^{\frac{(p_o-p)}{\beta}} + R}{\frac{R\beta}{\gamma p} + \left(\frac{p}{p_o}\right)^{\frac{1}{\gamma}} e^{\frac{(p_o-p)}{\beta}}} \right) \quad (5)$$

where $\beta$ is the bulk modulus of the pure liquid, $\gamma$ is the heat ratio of air, and R is the entrained air volume fraction at some absolute pressure $p_o$.

The instantaneous volume of each fluid volume depends on the actuator position. These volumes are described by $$V_A = A_{piston}\left(\frac{L_{stroke}}{2} - x\right) + V_{int} \text{ and} \quad (6)$$

$$V_B = A_{piston}\left(\frac{L_{stroke}}{2} + x\right) + V_{int} \quad (7)$$

where $A_{piston}$ is the area of the actuator piston, $L_{stroke}$ is the length of the actuator's stroke, and $V_{int}$ is the volume of the line intermediate to the check valve rectifier 16.

The force driving the actuator, F, is calculated from an assumed, constant mechanical efficiency. However, because the fluid volume in the actuator can store energy, this energy can cause work to be done on the WEC-driven actuator 14 by the compressed volume and thereby the WEC-driven actuator can do work on its surroundings. Therefore, the force between the WEC and the WEC-driven actuator is formulated as $$F = \begin{cases} \eta_{WEC}(p_A - p_B)A_{piston} & \text{if } \dot{x}(p_A - p_B) \le 0 \\ \dfrac{(p_A - p_B)A_{piston}}{\eta_{WEC}} & \text{if } \dot{x}(p_A - p_B) \ge 0 \end{cases} \quad (8)$$

where $\eta_{WEC}$ is the mechanical efficiency of the WEC-driven actuator.

Intermediate Line

It is assumed that some intermediate piping exists between the WEC-driven actuator 14 and the check valve rectifier 16. The pressure-drop across this piping is modeled by the Darcy-Weisbach equation formulated for pressure and flow rate $$\Delta p(q) = f \dfrac{\rho l q^2}{2 d A^2} \quad (9)$$

where f is the Darcy friction factor, l is the length of the pipe, d is the inner diameter of the pipe, and A is the flow area of the pipe. The Blasius correlation is used to estimate the Darcy friction factor in the turbulent regime (Re>4500) and an interpolation is used between the laminar and turbulent regimes (2300<Re<4500). This gives the following piecewise function:

$$f = \begin{cases} \dfrac{64}{\text{Re}} & \text{if } \text{Re} \le 2300 \\ f(2300) + \dfrac{f(4500) - f(2300)}{2200}(\text{Re} - 2300) & \text{if } 2300 < \text{Re} \le 4500 \\ 0.316 \text{Re}^{-\frac{1}{4}} & \text{if } \text{Re} \ge 4500 \end{cases}$$

Accumulators

The variations in pressure in accumulators 30a, 30b, 30c, 30d, relevant to this study are assumed to be fast with respect to the any dissipation of heat. The plant is also assumed to operate near room temperature. Therefore, the compression of the charged gas is modeled as isentropic compression of an ideal gas. This gives the pressure of the accumulator as $$p(V_{gas}) = p_{charge}\left(\dfrac{V_{charge}}{V_{gas}}\right)^{\gamma} \quad (11)$$

where $V_{gas}$ is the volume of the charged gas, $p_{charge}$ is the pressure that the accumulator is initially charged to, and $V_{charge}$ is the initial charged volume. The dynamics of the volume of gas are such that $$\dfrac{dV_{gas}}{dt} = (q_{out} - q_{in}) \quad (12)$$

where $q_{in}$ and $q_{out}$ are the flow into and out of the pressure node, respectively, and depend on the accumulator.

The stiffness and inertia of the diaphragm, as well as the resistance to fluid flow in and out of the accumulators are not considered. Therefore, having also assumed the compression of gas to be isentropic, hysteretic effects are neglected.

Valving

The flow rates through the check valves 116 and the two-way switching valve 114 are modeled by the orifice equation:

$$q(\Delta p, A) = C_d A \dfrac{\Delta p}{|\Delta p|}\sqrt{\dfrac{2}{\rho}|\Delta p|} \quad (12)$$

where $C_d$ is the discharge coefficient, A is the instantaneous flow area, and $\Delta p$ is the pressure drop in the positive flow direction, generically. As further discussed below, in one example there are five check valves in the circuit. In one example, four check valves are part of the check valve rectifier 16 and one is in the switch-mode power transformer 112.

Switching Valve

The instantaneous flow area of the switching valve 114 is modeled as a trapezoidal profile in time with a specified transition time. The ratio of time spent open with respect to the switching period is the duty ratio, as given in Eq. (1).

Check Valves

The flow areas of the check valves 116 are modeled by the following piecewise function:

$$A = \begin{cases} 0 & \text{if } \Delta p < p_{crack} \\ A_{max} \dfrac{\Delta p - p_{crack}}{2 p_{crack}} & \text{if } p_{crack} < \Delta p < 3 p_{crack} \\ A_{max} & \text{if } \Delta p > 3 p_{crack} \end{cases} \quad (13)$$

where $p_{crack}$ is the pressure difference at which the valve begins to open and $A_{max}$ is the maximum flow area. The transition of the valve area for pressure differences between the cracking pressure and three times the cracking pressure is implemented for purely practical reasons to mitigate numerical oscillations.

Long Line Model

The long pipeline between the WEC-driven actuator 14 and shore is model using a distributed parameter system with unsteady friction. This adds significant computational expense over a lumped parameter model. However, lumped parameter models are typically only appropriate for line lengths that are less than 4% of the wavelength of a significant excitation. The wavelength of a cyclic excitation, $\lambda_{ex}$, is the distance a pressure wave travels before the next excitation and can be estimated using the frequency of the excitation, $f_{ex}$, and an approximation of the speed of sound, a, by $$\lambda_{ex} = \frac{a}{f_{ex}}. \quad (14)$$

Various systems of the present disclosure have two separate excitations: the oscillatory flow from the WEC-driven actuator 14 and the switching of the switch-mode power transformer 112. The excitation from the switching might be negligible if the switching frequency is high and the onshore accumulator 30b upstream of the transformer 112 has a very large volume (therefore causing a negligible flow ripple). However, the oscillatory flow of the WEC-driven actuator 14 is not negligible. Typical wave periods are in the range of 6-12 seconds. With flow rectification, the frequency of excitation is 0.17-0.33 Hz generating a wavelength that is on the order of the pipeline length.

In the present disclosure, the Method of Characteristics (MOC) is used to solve the momentum and continuity equations. This is an efficient time-domain method for modeling line dynamics as it reduces the partial differential momentum and continuity equations for compressible fluid flow to two ordinary differential equations. This requires that the equations are solved along the characteristics for the system of PDEs given by $$\pm a = \frac{\Delta x}{\Delta t}. \quad (15)$$

where a is the sonic velocity, $\Delta x$ is the spatial step size and $\Delta t$ is the time step size. Note that this definition of the characteristics assumes a negligible flow velocity with respect to the sonic velocity. Assuming a thick-walled pipe, the sonic velocity is $$a_{eff} = \sqrt{\frac{\beta_{eff}(p)}{\rho}}. \quad (16)$$

An increase in piping loss occurs in unsteady flow due to in-plane velocity waves. Trikka formulated an approximation of the analytical solution for the unsteady friction loss. See, A. Trikha, "An Efficient Method for Simulating Frequency-," *J. Basic Eng.*, vol. March, pp. 97-105, 1975. This formulation, with the weighting coefficients given by Schohl, is used to model the unsteady friction in this disclosure. See, G. A. Schohl, "Improved Approximate Method for Simulating Frequency-Dependent Friction in Transient Laminar Flow," *J. Fluids Eng.*, vol. 115, no. 3, p. 420, 2008. Yudell provides detail on the implementation of this pipeline model. See A. C. Yudell and J. D. Van de Ven, "Experimental Validation of a Time Domain Cavitation Model for Switched Inertance Circuits," in *Proceedings of the ASME/BATH Symposium on Fluid Power and Motion Control*, 2017.

Pump/Motor and Generator

The pump/motor 124 is modeled by definitions of mechanical and volumetric efficiency. However, the pump/motor 124 switches between pumping and motoring modes with the switching of its inlet between high and low pressures. This necessitates piecewise definitions of these efficiencies, which follow.

The brake torque generated by the pump/motor 124 is modeled as $$T_{pm} = \begin{cases} \dfrac{D_{pm}(p_{sw} - p_{RO})}{\eta_{m,pm}} & \text{if } p_{sw} < p_{RO} \\ \eta_{m,pm} D_{pm}(p_{sw} - p_{RO}) & \text{if } p_{sw} > p_{RO} \end{cases} \quad (17)$$

where $\eta_{m,pm}$ is the mechanical efficiency and $D_{pm}$ is the kinematic displacement per radian. The flow rate passed through the pump/motor 124 is modeled by $$q_{pm} = \begin{cases} \eta_{v,pm} D_{pm} \omega & \text{if } p_{sw} < p_{RO} \\ \dfrac{D_{pm} \omega}{\eta_{v,pm}} & \text{if } p_{sw} > p_{RO} \end{cases} \quad (18)$$

where $\eta_{v,pm}$ is the volumetric efficiency, and $\omega$ is the angular velocity in radian per second. The pump/motor 124 power loss is given by $$P_{pm,loss} = q_{pm}(p_{sw} - p_{RO}) - T_{pm}\omega \quad (19).$$

The generator 26 might also switch modes between motor and generator operation if proper hardware was implemented so that the pump/motor 124 could be driven independent of power delivered offshore. However, this study does not consider this mode of operation. The electrical power generated is modeled assuming a constant efficiency such that $$P_{gen,elec} = \eta_{gen} T_{gen} \omega \quad (20)$$

where $\eta_{gen}$ is the efficiency of the generator 26 and $T_{gen}$ is the brake torque and is defined as positive in the direction of $\omega$. In this study, the torque is assumed to be directly controllable. The power loss of the generator 26 is $$P_{gen,loss} = T_{gen}\omega - P_{gen,elec} \quad (21).$$

The dynamics of the shaft angular velocity are modeled by $$\frac{d\omega}{dt} = \frac{1}{I_{gen}}(T_{pm} - T_{gen}) \quad (22)$$

where $I_{gen}$ is the moment of inertia of the generator 26 rotor and the rotating components of the pump/motor 124. Bearing friction has been neglected in favor of modeling the mechanical efficiency.

Charge Pump

The optional charge pump 24 provided in some embodiments is assumed to maintain the onshore low-pressure node at a constant pressure; that is, $P_L$,t is modeled as constant. Therefore, the flow rate through the charge pump 24 is $$q_{cp} = q_{L,in} + q_{sw,l} + q_{ERU,in} \quad (23).$$

The electrical power consumed by the charge pump 126 is $$P_{cp,elec} = \frac{q_{cp}(p_{cp,out} - p_{cp,in})}{\eta_{cp}\eta_{motor}} \quad (24)$$

where $\eta_{cp}$ is the pump efficiency, $\eta_{motor}$ is the efficiency of the electric motor driving the pump 26. These efficiencies have been assumed constant. The power loss for the charge pump 26 is $$P_{cp,loss} = P_{cp,elec} - q_{cp}(p_{cp,out} - p_{cp,in}) \quad (25).$$

Seawater or Fluid Intake

The intake lines 40 are modeled as a lumped pipe resistance. As with the intermediate lines, the pressure drop is given by Eq. (9) such that $$p_{cp,in} = p_o - \Delta p(q_{cp}) \quad (26)$$

and $$p_{cp,out} = p_{L,in} + \Delta p(q_{cp}) \quad (27)$$

where $p_0$ is atmospheric pressure (101.3 kPa). The resistive power loss in the intake line 40 is given by $$P_{intake,loss} = q_{cp}(p_o - p_{cp,in} + p_{cp,out} - p_{L,in}) \quad (28).$$

Design

The following disclosure present aspects of design relevant to this initial study of system 110. First, the control system used to regulate the system 110 is presented. Then, examples of system and component sizing is presented along with the parameters used in the numerical simulation of the system 110.

Control

Two separate controllers are used to regulate the plant or system 110. The states requiring control are the reverse osmosis feed pressure, $P_{RO}$, and the pressure of the onshore HPA 30b, $p_{H,out}$. The pressure in the onshore HPA 30b upstream of the power transformer 112 sets the pressure differential, or load, on the WEC-driven actuator 14. Two control inputs are assumed to be available: the torque of the generator 26 and the duty ratio of the switching valve 114.

Reverse Osmosis Feed Pressure

Control of reverse osmosis feed pressure is accomplished using the torque of the generator 26 as the control input. In steady-state, the flow through the pump/motor 124 would ideally match the high-pressure flow passed to the reverse osmosis system 18, $q_{RO}$. However, the brake torque of the pump/motor 124 switches between two extremes with the switching of the inlet pressure source. To fix the speed of the pump/motor 124 the torque demand from the generator 26 must mirror that of the pump/motor 124. However, this variation in generator 26 torque may not be reasonable or desirable for the electrical system.

To reduce the variation in the torque demanded of the generator 26, and instead allow the speed of the pump/motor 124 to vary about the mean steady-state speed, we introduce a first order low-pass filtered signal of $p_{RO}$ as the controlled system output, $p_{RO,lpf}$ such that $$\frac{dp_{RO,lpf}}{dt} = \frac{1}{\tau}(p_{RO} - p_{RO,lpf}) \quad (29)$$

where $\tau$ is the time constant of the filter. For a sufficiently low filter time constant, the control-loop remains stable. However, the time constant should be large enough so that cut-off frequency is lower than the switching frequency of the power transformer 112 and the generator 26 torque ripple is effectively reduced. Proportional-integral-derivative (PID) control is used. The control law is $$T_{gen} = k_{p,1} e_1 + \int k_{i,1} e_1 dt + k_{d,1} \frac{de_1}{dt} \quad (30)$$

where $k_{p,1}$, $k_{i,1}$, and $k_{d,1}$ are control gains and $e_1$ is the error between the reference feed pressure, $p_{RO,ref}$ and $p_{RO,lpf}$. The definition of error used is $$e_1 = p_{RO,ref} - p_{RO,lpf} \quad (31).$$

WEC Load

The switching valve 114 is used as the control input to control $p_{H,out}$. Note that the duty must be bound between zero and unity. Proportional-integral (PI) control with a feedforward term is used such that $$D = \min(1, \max(0, D_{ff} - k_{p,2} e_2 - \int k_{i,2} e_2 dt)) \quad (32)$$

where $D_{ff}$ is the feedforward term and $e_2$ is the error between the pressure setpoint, $p_{H,out,ref}$ and $p_{H,out}$. The following definition of error is used:

$$e_2 = p_{H,out,ref} - p_{H,out} \quad (33).$$

Gains

The controller gains used in this study are given in TABLE 1.

TABLE 1

| CONTROLLER GAINS | |
|---|---|
| RO feed pressure control | |
| Filter time constant, $\tau$ | 0.1592 |
| $k_{p,1}$ | $3 \times 10^{-3}$ |
| $k_{i,1}$ | $9 \times 10^{-3}$ |
| $k_{d,1}$ | $1 \times 10^{-3}$ |
| Load control | |
| $k_{p,2}$ | $1 \times 10^{-8}$ |
| $k_{i,2}$ | $1 \times 10^{-7}$ |

Sizing/Plant Operation

In one example, the system 110 is sized to produce 1000 cubic meters per day of potable water. The target mean input power to the WEC-driven actuator 14 is 200 kW. Such a plant could be driven by a single WEC-driven actuator 14, such as the Oyster 1, which was rated for 315 kW, or a number of WECs in parallel having lower power ratings, such as the SurgeWEC developed by Resolute Marine Energy (see, "Resolute Marine Energy." [Online]. Available: http://www.resolutemarine.com/. [Accessed: 15 Apr. 2019].). The nominal pressure differential across the input actuator is taken to be 30 MPa. Reverse osmosis systems using spiral-wound membrane elements are typically rated for either 1000 or 1200 psi. In the present disclosure, the inventors assumed a system operating with a target 1000 psi feed pressure.

Rühlicke and Hagg discuss practical design challenges for the WEC-driven actuators used for the Oyster 1 and suggest that these were designed for a mean absolute velocity of 0.16 m s$^{-1}$ [20]. This value is used for $|\dot{x}|_{ave}$ in the calculation of the WEC-driven actuator position. The mean WEC input power and nominal pressure differential of the actuator fix the desired mean flow rate driven by the actuator. Therefore, this mean absolute velocity establishes a required displacement of the actuator. The parameters for the WEC-driven actuator 14 are provided in Table 2.

The check valves that comprise the check valve rectifier 16 are sized to give a pressure drop of 3 bar at peak flow.

Likewise, the switching valve 114 and check valve 116 leading to the pump/motor 124 are sized to give a pressure drop of 3 bar at a flow rate equal to the mean pump/motor 124 flow rate. The parameters for these valves are given in Table 3.

The remaining model parameters used in this study have been tabularized below. The physical properties of the working fluid and the accumulator charge gas are provided in Table 4. The parameters for the pipelines are provided in Table 5, accumulators 30a, 30b, 30c, and 30d in Table 6, and the switch-mode power transformer 112 in Table 7. The assumed component efficiencies are provided in Table 8.

TABLE 2

WEC PUMP PARAMETERS

| | |
|---|---|
| Actuator piston area, $A_{piston}$ | 0.04 m$^2$ |
| Actuator stroke, $L_{stroke}$ | 1.2 m |

TABLE 3

VALVE PARAMETERS

| | |
|---|---|
| Discharge coefficient, $C_d$ | 0.6 |
| High-pressure rectifier check valves | |
| Maximum flow area, $A_{max}$ | 0.0007 m$^3$ |
| Cracking pressure, $p_{crack}$ | 100 kPa |
| Low-pressure rectifier check valves | |
| Maximum flow area, $A_{max}$ | 0.0007 m$^3$ |
| Cracking pressure, $p_{crack}$ | 100 kPa |
| Switch-mode transformer check valve | |
| Maximum flow area, $A_{max}$ | 0.0012 m$^3$ |
| Cracking pressure, $p_{crack}$ | 100 kPa |
| Switch-mode transformer switching valve | |
| Maximum flow area, $A_{max}$ | 0.0012 m$^3$ |
| Transition ratio | 0.05 |
| Switching frequency | 20 Hz |

TABLE 4

PHYSICAL PARAMETERS

| | |
|---|---|
| Working fluid: seawater at 25° C. with 35000 ppm NaCl | |
| Density, ρ | 1023 kg m$^{-3}$ |
| Absolute viscosity, μ | 9.4 × 10$^{-4}$ Pa s |
| Bulk modulus, β | 2.2 GPa |
| Entrained air volume fraction at atmospheric pressure, R | 0.005 |
| Accumulator charge gas: air | |
| Specific heat, γ | 1.4 |

TABLE 5

PIPING PARAMETERS

| | |
|---|---|
| Intermediate line | |
| Length | 10 m |
| Inner diameter | 0.1 m |
| High-pressure pipeline | |
| Length | 500 m |
| Inner diameter | 0.1 m |
| Sonic velocity | 1460 m s$^{-1}$ |

TABLE 5-continued

PIPING PARAMETERS

| | |
|---|---|
| Low-pressure pipeline | |
| Length | 500 m |
| Inner diameter | 0.1 m |
| Sonic velocity | 920 m s$^{-1}$ |
| Seawater intake pipeline, first reach | |
| Length | 10 m |
| Inner diameter | 0.1 m |
| Seawater intake pipeline, second reach | |
| Length | 490 m |
| Inner diameter | 0.1 m |

TABLE 6

ACCUMULATOR PARAMETERS

| | Volume (L) | Pre-charge (MPa) |
|---|---|---|
| RO inlet HPA | 200 | 4 |
| onshore HPA | 100 | 20 |
| offshore HPA | 150 | 20 |
| offshore LPA | 150 | 0.1 |

TABLE 7

SWITCH-MODE TRANSFORMER PARAMETERS

| | |
|---|---|
| Pump/motor displacement | 450 cm$^3$rev$^{-1}$ |
| Generator moment of inertia | 0.4 kg m$^2$ |
| Switched volume, $V_{sw}$ | 500 cm$^3$ |
| Switching frequency, $f_{sw}$ | 20 Hz |

TABLE 8

ASSUMED COMPONENT EFFICENCIES

| | |
|---|---|
| WEC-driven actuator mechanical, $\eta_{WEC,m}$ | 0.9 |
| Pump/motor mechanical, $\eta_{pm,m}$ | 0.9 |
| Pump/motor volumetric, $\eta_{pm,v}$ | 0.9 |
| Generator, $\eta_{gen}$ | 0.9 |
| Charge pump, $\eta_{cp}$ | 0.9 |

Simulation Result

Two separate simulations were performed and are presented below. First is an isolated model of the switch-mode power transformer 112 with a constant pressure of 30 MPa as the controller set point pressure $p_{H,out}$, 6.9 MPa as the controller set point $p_{RO,ref}$, and a duty ratio of 0.6. Second, is the full model with 30 MPa as $p_{H,out,ref}$ and 6.9 MPa as $p_{RO,ref}$, a mean absolute actuator velocity, $|\dot{x}|_{ave}$, of 0.16 m s$^{-1}$, and a wave period, $T_w$, of 12 seconds.

Methods

These simulations were run until cyclical steady-state was reached. The model was solved numerically using an Euler solver with a time step of 5×10−6 seconds; however, the distributed parameter line models were solved at a larger time step of 1×10$^{-3}$ seconds. The control inputs were updated with a time step of 0.01 seconds.

Results

Figures 5A, 5B:
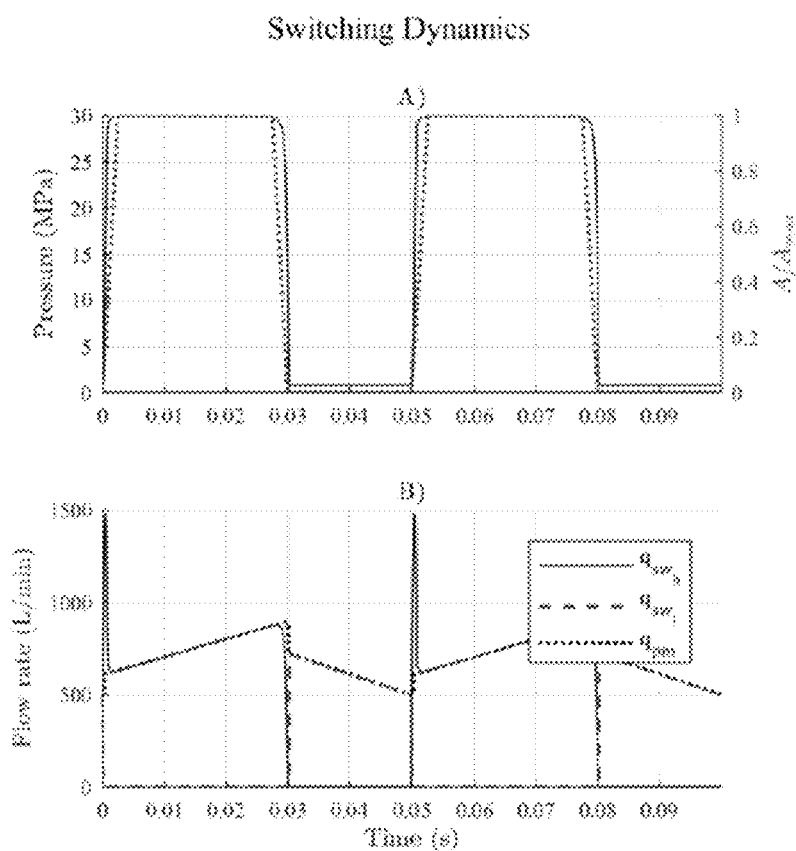
FIGS. 5A-5B are graphs illustrating switch-mode power transformer dynamics.

The dynamics of the switch-mode transformer 112 from the isolated switch-mode transformer simulation are presented in FIGS. 5A-5B. Two switching cycles are shown.

FIG. 5A presents the pressure in the switched volume and the area fraction of the switching valve, while FIG. 5B presents the flow rates in and out of the volume.

Two features of the dynamics are evident. First, there is a significant spike in flow rate as the switching valve 114 opens coupled with a high pressure drop across the valve. Second is the positive and negative ramps in flow rate during the two discrete parts of the switching cycle created by the acceleration and deceleration of the pump/motor 124 and shaft speed of the generator 26.

The results of the full system simulation are now presented for one steady-state wave cycle (12 seconds). First, the behavior of the controlled states and control inputs are given in FIGS. 6A-6B. The control of the reverse osmosis inlet pressure at a reverse osmosis inlet HPA 30$d$ is shown in FIG. 6A. The reverse osmosis pressure varies at two different time scales. At the time scale of the PWM switching, the pressure varies with a relatively low magnitude, but with high rates of change due to the high switching frequency; this is most obvious just after 4 seconds where the line appears to thicken due to a high rate oscillation. The filtered signal lags a little but has a substantially reduced magnitude of variation. At the longer time scale, the pressure varies with the dynamics of the long pipeline; although, the pressure variation is less than 0.1 MPa. The torque demand from the generator 26 varies considerably as well. At the longer time scale, the torque varies with an amplitude of nearly 400 Nm. At the time scale of switching however, there is only a small apparent variation.

In FIG. 6B, the WEC load control is shown to maintain the pressure of the onshore HPA 30$b$ near the reference pressure with variation having an amplitude of about 2 MPa. The duty varies about a mean of about 0.5 and with an amplitude of 0.2.

Figure 7A:
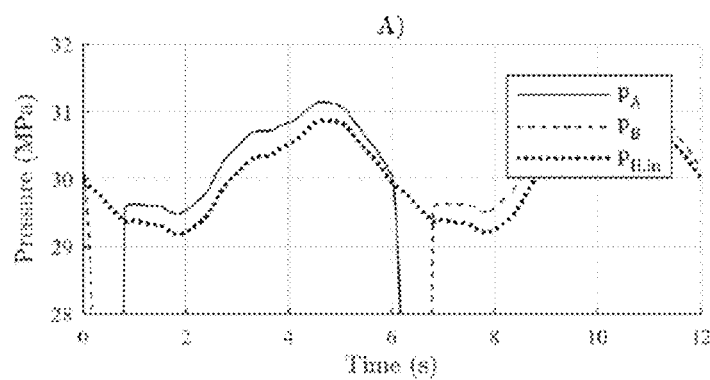
FIGS. 7A-7C are graphs illustrating wave energy converter-driven pumping dynamics.
Figure 7B:
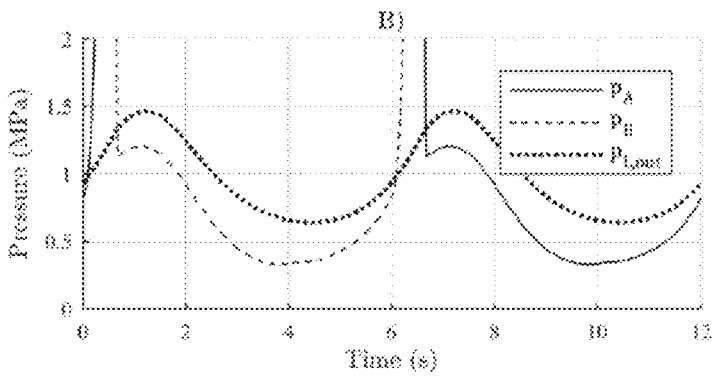
Figure 7C:
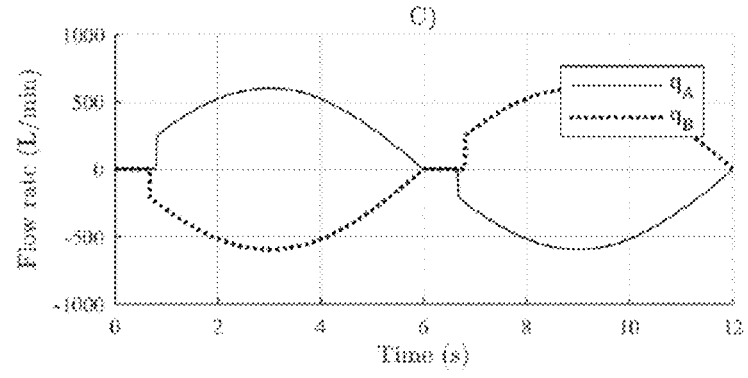

In FIGS. 7A-7C, the pressure and flow dynamics of the WEC-driven pumping are shown. The same pressure traces are shown with different vertical-axis limits in FIGS. 7A and 7B for visualization of the chamber pressure behavior during both direction reversals of the WEC-driven actuator 14. The accumulator 30$a$ and 30$c$ pressures are given as well, and show the pressure drop across the check valve rectifier 16. FIG. 7C shows the flow rate in and out of the WEC-driven actuator 14. An important feature of these dynamics is the interruption of flow when the WEC 4 reverses direction (at 0 seconds and 6 seconds). During this period of interruption, there is compression and decompression of the individual pumping chambers until the pressure differences across the check valves 116 reach the cracking pressure. Through part of this compression/decompression, power will be flowing from the WEC-driven actuator 14 through the WEC and to the surroundings and could be considered a loss.

The dynamics of the high and low-pressure pipelines are given in FIGS. 8A-8B and FIGS. 9A-9B, respectively. Each of these show significant pressure wave delay effects. FIG. 8A reveals that the difference between the inlet and outlet pressure of the high-pressure pipeline switches direction with a period of about 1 second, while the WEC-driven actuator 14 oscillates with a period of 12 seconds. In FIG. 8B, a difference and delay in flow rates in and out reveal the storage and release of energy in the pipeline. Some smoothing of flow by the pipeline is evident with the lower magnitude of the out flow.

The behavior of the low-pressure pipeline appears different in nature, likely owing to the constant pressure boundary condition upstream. These dynamics are significant nonetheless. In FIG. 9A, the pressure varies with an amplitude of about 1 MPA about a mean of 1 MPA. In FIG. 9B, the flow rate is about 90 degrees out of phase with the flow rate through the check valve rectifier 16. At 2 and 8 seconds, the flow rate out of the pipe drops near zero. The storage and release of fluid is apparent with the difference in flow in and out of the pipe, as with the high-pressure line.

Quantified Results

To quantify the performance of the plant 110 the following efficiencies are defined. The efficiency of the pumping system composed of the WEC-driven actuator 14 and the check valve rectifier 16 is defined by $$\eta_{WECpump} = \frac{\int \left((q_{c3}+q_{c4})_{p_{H,in}} - (q_{c1}+q_{c2})_{p_{L,out}}\right) dt}{\int \max(F\dot{x}, 0) dt}. \tag{34}$$

Note that a negative result of Fx corresponds to the WEC doing work on the surroundings and is considered a power loss. This is removed by the max(*) operator.

The efficiency of power transformer 112 is defined as $$\eta_{pt} = \frac{\int (q_{pm}(p_{RO} - p_{L,in}) + T_{pm}\omega) dt}{\int q_{sw,h}(p_{H,out} - p_{L,in}) dt} \tag{35}$$

with the work delivered to the reverse osmosis system 18 and to the generator 26 at the shaft as outputs and the work from the high-pressure line as the input.

The efficiency of the entire system 110—taking the work done by the WEC on the actuator 14 as the input and taking the surplus electrical energy production and hydraulic work delivered to the reverse osmosis system 18 as outputs—is expressed as $$\eta_{sys} = \frac{\int \left( \begin{array}{c} q_{RO}(p_{RO} + p_o) + \\ q_{ERU,in}(p_{L,in} + p_o) + P_{gen,elec} - P_{cp} \end{array} \right) dt}{\int \max(F\dot{x}, 0) dt}. \tag{36}$$

Note that this neglects the electrical power required to operate the energy recovery device or any other power consuming device in the reverse osmosis system 18.

The efficiency results, mean power captured, mean electrical power produced, mean power consumed by the charge pump 24, and the mean surplus power (the produced electrical power minus the power consumed by the charge pump 24) are provided in Table 9. The losses in the system 110 are tabularized in the order of descending magnitude in Table 10.

Discussion

It is evident that the switch-mode power transformer 112 of FIG. 3 accomplishes the goal to decouple the pressures of the power-take-off and reverse osmosis process. Additionally, the efficiency for the switch-mode power transformer 112 at 76% suggests that this is a better approach than the conventional power transformer, which would likely be in the range of 65-70% (assuming a total efficiency of 0.81 for both the pump and motor).

TABLE 9

POWER AND EFFICENCY RESULTS

| | |
|---|---|
| WEC power capture | 205 kW |
| electrical power generated, mean | 56.9 kW |
| electrical power consumed by charge pump, mean | 53.7 kW |
| surplus electrical power generated, mean | 3.22 kW |
| actuator pumping efficiency, $\eta_{WEC\,pump}$ | 0.864 |
| switch-mode power transformer efficiency, $\eta_{pt}$ | 0.764 |
| system efficiency, $\eta_{sys}$ | 0.450 |

More generally, the primary losses are found to be from the pump/motor 124, charge pump 24, WEC-driven actuator 14 mechanical operation, and generator 26; naturally, each of these are major functional components. The losses from the valves for the switch-mode power transformer 112 total 8.3 kW, which accounts for 4% of the losses in the entire fluid circuit 110; this is a small cost in power in the way of enabling the decoupling of the pressures of the wave energy harvesting process and reverse osmosis process. The piping losses not associated with the intake total less than 1 kW; these are clearly oversized. The unsteady piping losses are very low and are likely to be negligible, even for more optimally sized pipelines.

TABLE 10

MEAN POWER LOSS RESULTS

| | |
|---|---|
| Pump/motor | 33.6 kW |
| Charge pump | 24.7 kW |
| WEC mechanical loss | 20.5 kW |
| Generator | 10.0 kW |
| Intake piping | 8.11 kW |
| Switching valve | 6.78 kW |
| Check valve rectifier | 3.95 kW |
| Switch-mode check valve | 1.46 kW |
| Low-pressure pipeline, steady | 0.367 kW |
| High-pressure pipeline, steady | 0.207 kW |
| Low-pressure pipeline, unsteady | 0.0270 kW |
| Intermediate line | 0.0120 kW |
| High-pressure pipeline, unsteady | 0.00757 kW |

It is also evident that the dynamics of a wave-powered plant are extreme and may pose a challenge to the designer, especially the pipeline dynamics. Although, the pipeline dynamics may be significantly damped by selecting a smaller diameter pipeline. This study assumed simple, sinusoidal WEC motions, when in fact realistic waves are very irregular. In these irregular waves the WECs have much greater peak-to-mean power capture. This would only further complicate the dynamics and produce more extreme transient behavior.

It is further envisioned that aspects of the system or plant or fluid power circuit 110 of FIG. 3 can be incorporated into brackish or mine wastewater treatment systems. Generally, in these alternate embodiments the switch-mode hydraulic power transformer 112 transforms input from high-pressure flow generated by the wave-energy harvesting power-take-off or process to pressures needed for the reverse osmosis process, wherein the switch-mode power transformer 112 uses a hydraulic inertial element to store and release kinetic energy. Beyond water treatment, it is envisioned that the switch mode hydraulic power transformer 112 can be applicable to remote actuation where the reverse osmosis system 18 is replaced by some actuator.

Conclusion

The aforementioned disclosure demonstrates a unique application of a switch-mode hydraulic system. In fact, embodiments of the disclosure solve an inherent problem in implementing a wave-powered reverse osmosis desalination plant.

Although the present disclosure has been described with reference to preferred embodiments, workers skilled in the art will recognize that changes can be made in form and detail without departing from the spirit and scope of the present disclosure.

What is claimed is:

1. A fluid power circuit comprising:
   a hydraulic power source having a high-pressure end and a low-pressure end;
   a switch-mode transformer having a pumping mode and a motoring mode; the switch-mode power transformer including:
      valving that connects a hydraulic inertial element to the high-pressure and low-pressure end of the hydraulic power source, and
      the hydraulic inertial element having an outlet to a load and an electric generator having a rotor; and
   a reverse osmosis system;
   wherein when the valving is open to the high-pressure source and closed to the low-pressure source, the hydraulic inertial element is fluidly connected to the high-pressure end and the hydraulic inertial element operates as a motor;
   wherein when the valving is closed to the high-pressure source and open to the low-pressure source, the hydraulic inertial element is fluidly connected to the low-pressure end and the hydraulic inertial element operates as a pump;
   further wherein the generator is configured to convert excess mechanical power to electrical power, maintaining a mean fluid flow rate supplied to the reverse osmosis system.

2. The fluid power circuit of claim 1, wherein the valving includes a switching valve and a check valve.

3. The fluid power circuit of claim 1, wherein the hydraulic inertial element is a hydraulic pump/motor.

4. The fluid power circuit of claim 1, wherein the hydraulic power source is part of a wave energy converter.

5. The fluid power circuit of claim 1, wherein the hydraulic inertial element is fluid in a pipe.

6. The fluid power circuit of claim 1, comprising a charge pump.

7. The fluid power circuit of claim 1, comprising an accumulator.

8. A wave-powered reverse osmosis desalination plant comprising:
   a wave energy converter including a hydraulic power source having a high-pressure end and a low-pressure end;
   a switch-mode power transformer having a pumping mode and a motoring mode; the switch-mode power transformer including:
      valving that connects a hydraulic inertial element to the high-pressure and low-pressure end of the hydraulic power source, and
      the hydraulic inertial element having an outlet to a load and an electric generator having a rotor; and
   a reverse osmosis system;
   wherein when the valving is open to the high-pressure source and closed to the low-pressure source, the hydraulic inertial element is fluidly connected to the high-pressure end and the hydraulic inertial element operates as a motor;

wherein when the valving is closed to the high-pressure source and open to the low-pressure source, the hydraulic inertial element is fluidly connected to the low-pressure end and the hydraulic inertial element operates as a pump;

further wherein the generator is configured to convert excess mechanical power to electrical power, maintaining a mean fluid flow rate supplied to the reverse osmosis system.

9. The plant of claim 8, wherein the valving includes a check valve and a switching valve.

10. The plant of claim 8, wherein the hydraulic inertial element is a hydraulic pump/motor.

11. The plant of claim 8, wherein the hydraulic power source is part of a wave energy converter.

12. The plant of claim 8, wherein the hydraulic inertial element is a long, small-diameter pipe.

13. The plant of claim 8, comprising a charge pump.

14. The plant of claim 8, comprising an accumulator.

15. A method of producing power, the method comprising:

providing a wave-powered reverse osmosis desalination plant including:

a wave energy converter including a hydraulic power source having a high-pressure end and a low-pressure end, a switch-mode power transformer having a pumping mode and a motoring mode, the switch-mode power transformer including:

valving that connects a hydraulic inertial element to the high-pressure and low-pressure end of the hydraulic power source, and the hydraulic inertial element having an outlet to a load and an electric generator having a rotor; and a reverse osmosis system.

16. The method of claim 15, comprising opening the valving so that the hydraulic inertial element is fluidly connected to the high-pressure end and the hydraulic inertial element operates as a motor.

17. The method of claim 16, wherein, when the valving is opened, a rotor of the hydraulic inertial element rotates.

18. The method of claim 16, wherein the generator converts excess mechanical power generated by the rotor to electrical power, thereby maintaining a mean fluid flow rate supplied to the reverse osmosis system.

19. The method of claim 15, wherein the hydraulic inertial element is a hydraulic pump/motor.

20. The method of claim 15, comprising closing the valving so that the hydraulic inertial element is fluidly connected to the low-pressure end and the hydraulic inertial element operates as a pump.

\* \* \* \* \*